(12) United States Patent
Lin

(10) Patent No.: US 7,513,560 B2
(45) Date of Patent: Apr. 7, 2009

(54) CLEAR-VIEW SUN VISOR

(75) Inventor: William C. Lin, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 413 days.

(21) Appl. No.: 11/372,711

(22) Filed: Mar. 10, 2006

(65) Prior Publication Data

US 2007/0210604 A1   Sep. 13, 2007

(51) Int. Cl.
*B60J 3/04* (2006.01)
(52) U.S. Cl. ............... 296/97.4; 296/97.2; 296/97.8
(58) Field of Classification Search ............. 296/97.2, 296/97.4, 97.8, 97.9, 97.11
See application file for complete search history.

(56) References Cited

U.S. PATENT DOCUMENTS 5,261,717 A * 11/1993 Tsumura et al. ............ 296/97.2
7,134,707 B2 * 11/2006 Isaac ........................ 296/97.6

* cited by examiner

*Primary Examiner*—Joseph D Pape

(57) ABSTRACT

A sun visor that includes a clear base portion and a small shade portion that can be selectively moved to block only the sun depending on its orientation. In one embodiment, the shade portion is manually movable relative to the base portion. In another embodiment, the shade portion is automatically moved relative to the base portion by an actuator. A controller calculates the vehicle heading and the sun-incident angle to determine the proper position of the shade portion. A switch can be used to switch the actuator on when the visor is in the down position. In an alternate embodiment, the shade portion is replaced with electro-chromic elements mounted to the base portion that are controlled to selectively block the sunlight.

19 Claims, 6 Drawing Sheets

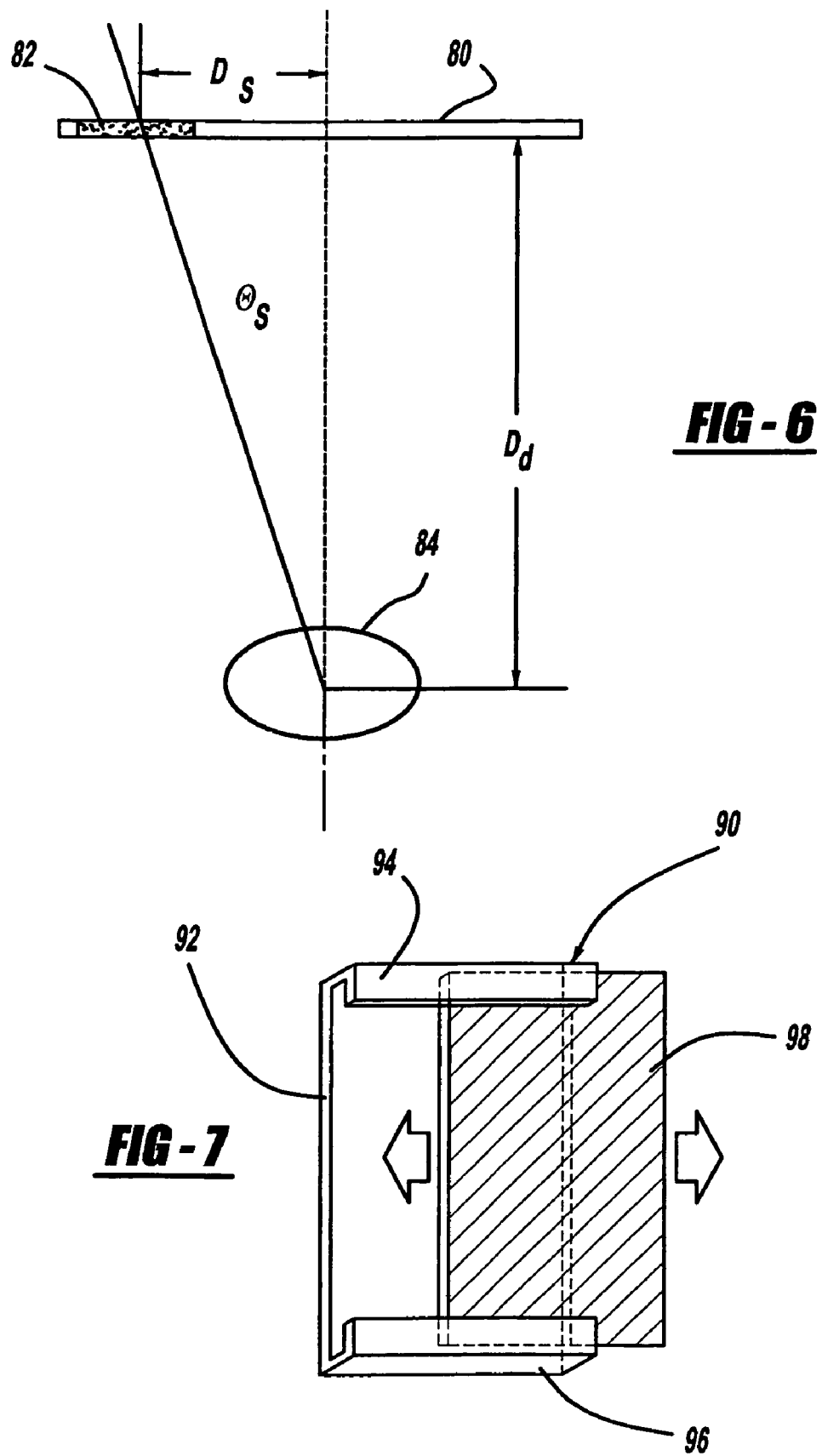

CLEAR-VIEW SUN VISOR

BACKGROUND OF THE INVENTION

1. Field of the Invention

This invention relates generally to a vehicle sun visor and, more particularly, to a vehicle sun visor that includes a clear base portion and a small shade portion that can be selectively moved relative to the base portion to cover different sun angles.

2. Discussion of the Related Art

Most vehicles are equipped with sun visors that can be selectively flipped down from a stored position if the vehicle is traveling into a low sun angle so that the driver is not staring directly into the sun. The sun visor makes the driving experience more pleasant, and also has an obvious safety value. However, when a typical sun visor is in its down position to block the sunlight, it also may block other things at the same level, including traffic lights. Because it is important for the vehicle operator to know the status of the traffic light, this may become a serious issue. Further, other important signs can also be blocked by the sun visor, which may affect traffic flow, especially during rush hour conditions. Therefore, it would be desirable to provide a sun visor that only blocked the sun itself, and left the rest of the field of view open.

SUMMARY OF THE INVENTION

In accordance with the teachings of the present invention, a sun visor is disclosed that includes a clear base portion and a small shade portion that can be selectively moved relative to the base portion to block only the sun depending on its orientation. In one embodiment, the shade portion is manually movable relative to the base portion. In another embodiment, the shade portion is automatically moved relative to the base portion by an actuator. A controller calculates the vehicle heading and the sun-incident angle to determine the proper position of the shade portion. A switch can be used to switch the actuator on when the visor is in the down position. In an alternate embodiment, the shade portion is replaced with electro-chromic elements mounted to the base portion that are controlled to selectively block the sunlight.

Additional features of the present invention will become apparent from the following description and appended claims taken in conjunction with the accompanying drawings.

BRIEF DESCRIPTION OF THE DRAWING

FIG. 6 is a diagrammatic view for determining the position of the shade portion of the sun visor of the invention;

FIG. 7 is a front view of a shade assembly for a clear-view sun visor of the invention where the assembly includes a slideable shade piece;

DETAILED DESCRIPTION OF THE EMBODIMENTS

The following discussion of the embodiments of the invention directed to a clear-view sun visor including a selectively moveable shade portion is merely exemplary in nature, and is in no way intended to limit the invention or its applications or uses.

Figure 1:
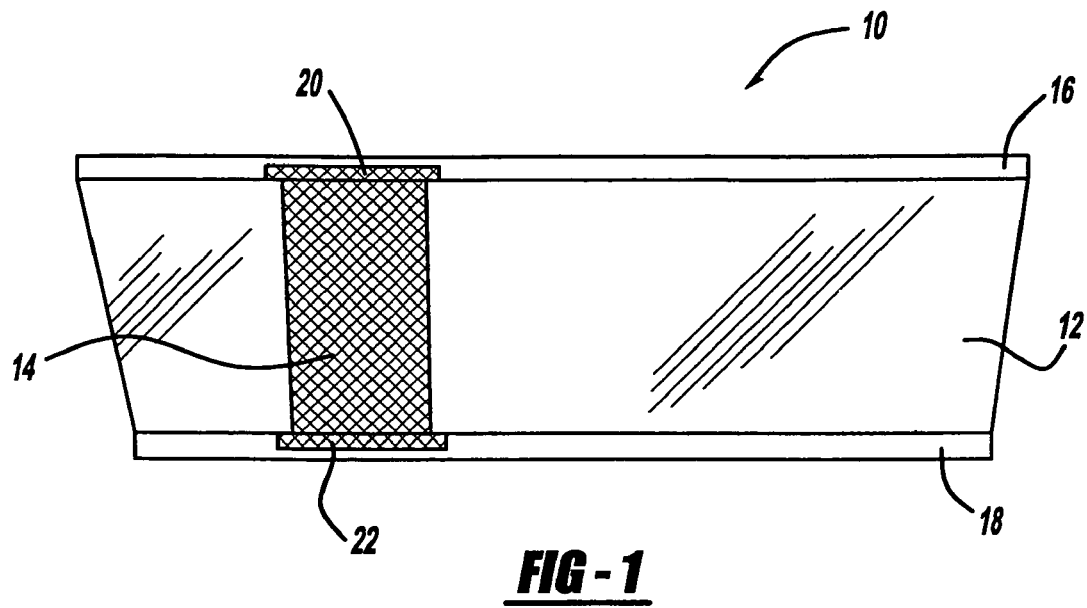
FIG. 1 is a front view of a clear-view sun visor including a manually moveable shade portion, according to an embodiment of the present invention.

FIG. 1 is a front view of a vehicle sun visor 10, according to an embodiment of the present invention. The sun visor 10 includes a clear base portion 12 and a slideable shade portion 14. In one embodiment, the base portion and the shade portion are each a single piece plastic component. The shade portion 14 can be opaque or translucent. The clear portion 12 includes an upper track 16 and a lower track 18. The shade portion 14 includes an end portion 20 that is slideable within the track 16 and an end portion 22 that is slideable within the track 18. The sun visor 10 mounts to the vehicle, such as the A-pillar, in any conventional manner so that the sun visor 10 can be rotated between a stored position and a flipped down position, and can be rotated to cover a side window of the vehicle, as is well understood to those skilled in the art. When the sun visor 10 is in the down position, as shown, the shade portion 14 is facing the driver so that the driver can manually slide the shade portion 14 along the tracks 16 and 18 to any suitable location depending on the orientation angle of the sun. In this manner, only the sun itself is blocked to allow the driver to see other objects that may otherwise be blocked with conventional sun visors. In one embodiment, the shade portion 14 is about four inches wide, and thus, has a dimension so that it will completely block the sun if both eyes of the driver are open.

Figure 2:
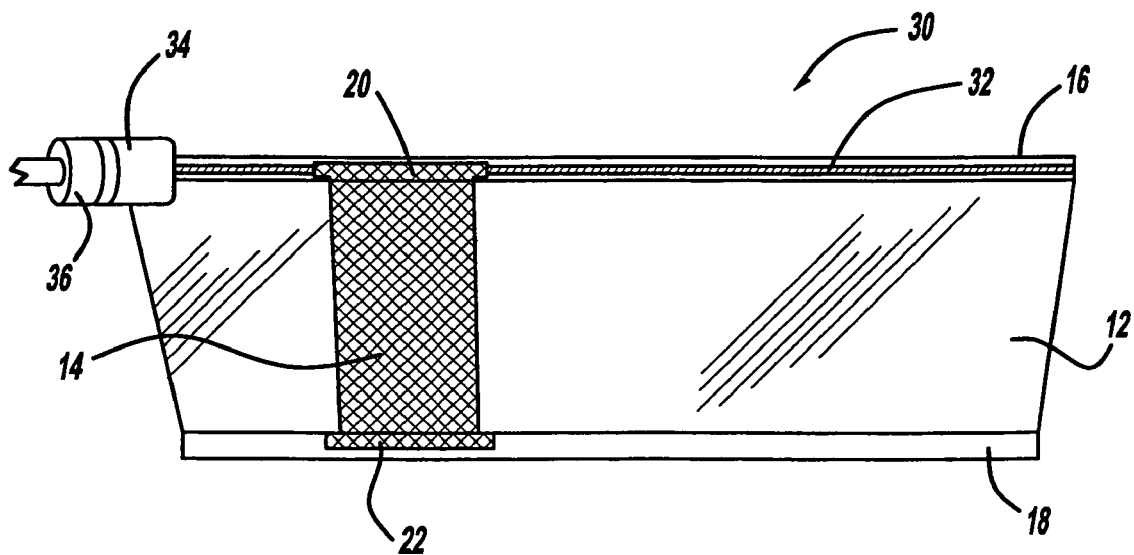
FIG. 2 is a front view of a clear-view sun visor including an electronically moveable shade portion, according to an embodiment of the present invention.

FIG. 2 is a front view of a vehicle sun visor 30 similar to the sun visor 10, where like elements are identified by the same reference numeral. The sun visor 30 includes a screw 32 positioned within the track 16 that is attached to the end portion 20. An electric actuator 34 is mounted to an upper left corner of the base portion 12, and the screw 32 is rotatably mounted to actuator 34. When the actuator 34 is actuated, the screw 32 turns causing the shade portion 14 to slide along the tracks 16 and 18. When the screw 32 is turned in one direction, the shade portion 14 will move in one direction and when the screw 32 is turned in the opposite direction, the shade portion 14 will move in the opposite direction.

The sun visor 30 also includes a switch 36 mounted proximate to the actuator 34 that turns on the actuator 34 depending on the orientation of the sun visor 30. Particularly, if the sun visor 30 is in the stored position, the switch 36 automatically turns off the actuator 34. However, when the sun visor 30 is flipped down, the switch 36 turns on the actuator 34. As will be discussed in detail below, a system is provided for determining the vehicle heading, the sun angle, etc. to automatically determine the position of the shade portion 14 when the visor 30 is in the down position.

Figure 3:
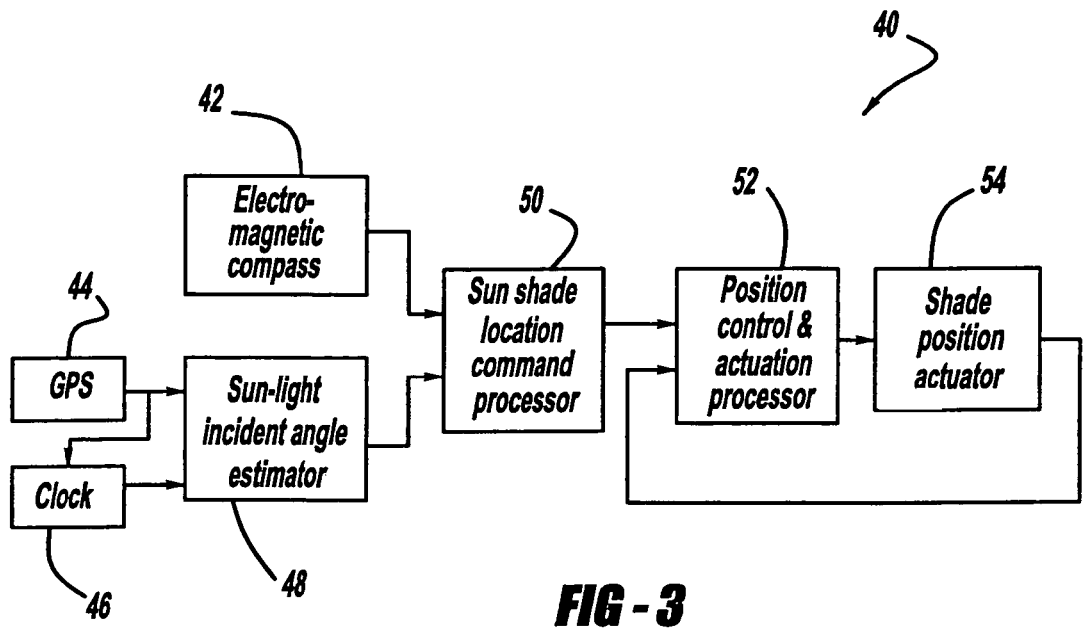
FIG. 3 is a block diagram of a system for automatically controlling the position of the shade portion of the clear-view sun visor shown in FIG. 2, according to an embodiment of the present invention.

FIG. 3 is a block diagram of a control system 40 that provides a control signal to the actuator 34 to control the position of the shade portion 14. The control system 40 includes an electromagnetic compass 42 that provides vehicle heading information. The compass 42 can quantify the vehicle heading angle, for example, according to the Cartesian coordinate system where east is 0°, north is 90°, south is 270° and west is 180°. The system 40 also includes a GPS receiver 44 that provides the location of the vehicle and a clock 46 that provides a time of day signal. The clock information is also updated by the GPS location for the time zone. A sun-light incident angle estimator 48 uses the GPS signal and the clock signal to determine an incident angle of the sunlight. Particularly, by knowing where the vehicle is and what time of year it is, an algorithm can be provided to give the angle of the sunlight.

The vehicle heading signal from the compass 42 and the sunlight incident angle from the estimator 48 are provided to a sun-shade location command processor 50. In one embodiment, the system 40 is calibrated so that if the vehicle heading angle and the sunlight incident angle are the same, the shade portion 14 will be positioned at a center or 0° location of the base portion 12.

Figure 4:
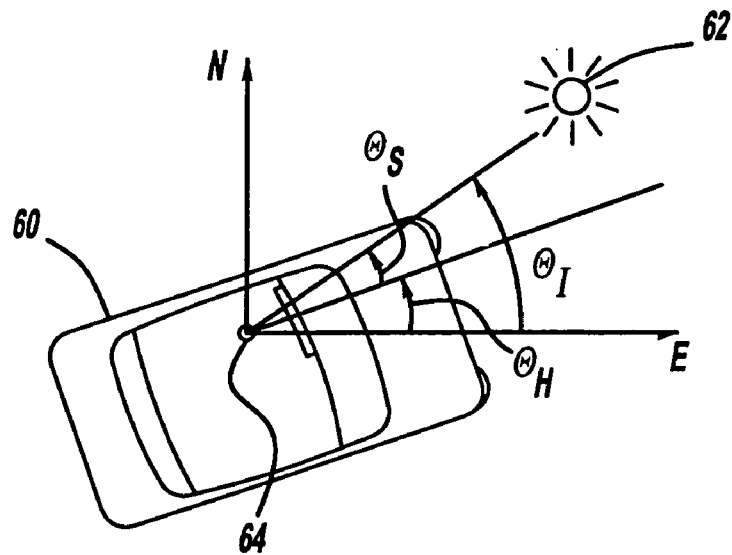
FIG. 4 is a plan view of a vehicle having a vehicle heading and an orientation relative to the sun.

FIG. 4 illustrates a vehicle 60 relative to the sun 62. The vehicle heading is given as $\theta_H$ relative to the eastward direction and the sun incident angle is given as $\theta_I$ relative to the eastward direction. The difference between the vehicle heading angle $\theta_H$ and the vehicle sun angle $\theta_I$ gives a sun-shade angle $\theta_S$ to determine the position of the shade portion 14.

Figure 5:
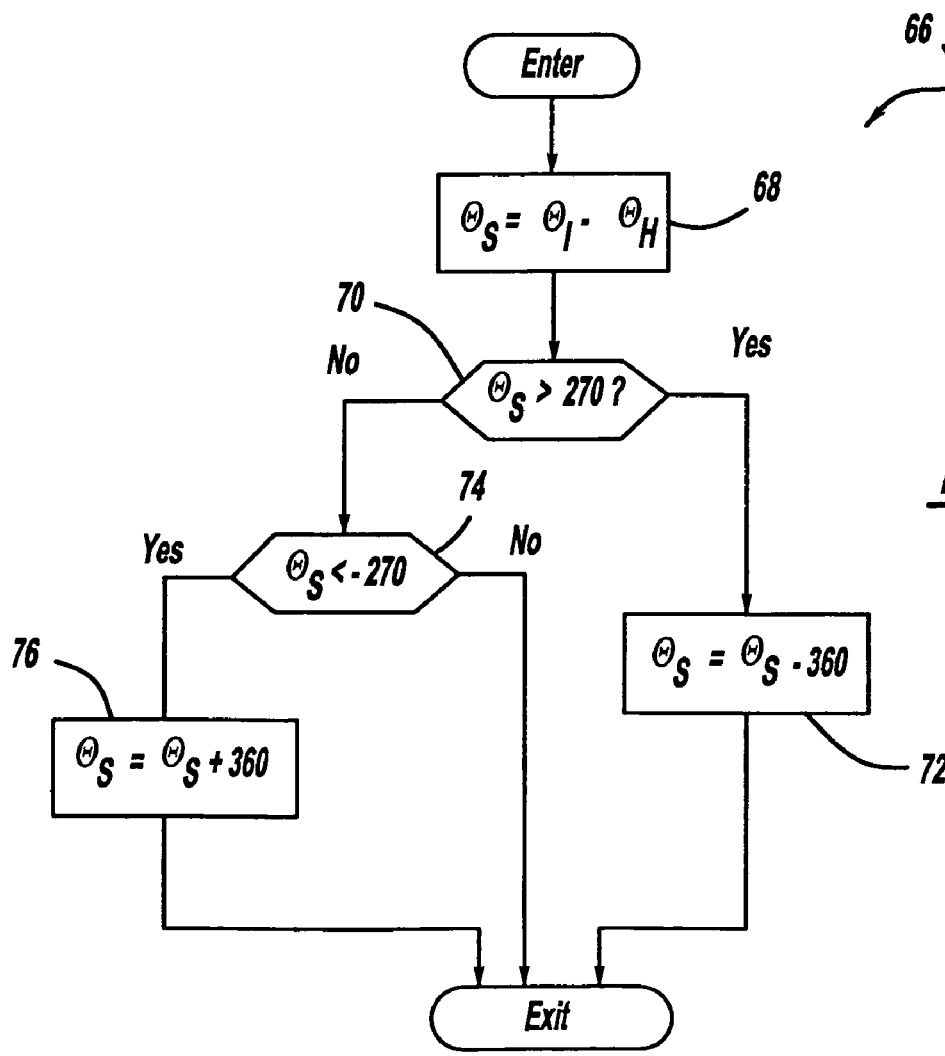
FIG. 5 is a flow chart diagram showing a technique for calculating the sun-shade angle, according to an embodiment of the present invention.

FIG. 5 is a flow chart diagram 66 for computing the sun-shade angle $\theta_S$ to provide a value ranging between +90° and −90°, according to one non-limiting embodiment of the invention. Particularly, if 0° is the center of the base portion 12, then +90° is the position of the shade portion all the way to one end of the of the base portion and −90° is the position of the shade portion all of the way to the other end of the base portion. The algorithm first computes the sun-shade angle $\theta_S$ based on the vehicle heading angle $\theta_H$ and the sun angle $\theta_I$ at box 68. The algorithm then determines whether the sun-shade angle $\theta_S$ is greater than 270° at decision diamond 70. If the sun-shade angle $\theta_S$ is greater than 270° at the decision diamond 70, then the algorithm sets the sun-shade angle $\theta_S$ as $\theta_S$ −360° at box 72. If the sun-shade angle $\theta_S$ is not greater than 270° at the decision diamond 70, then the algorithm determines whether the sun-shade angle $\theta_S$ is less than −270° at decision diamond 74. If the sun-shade angle $\theta_S$ is not less than −270° at the decision diamond 74, then the algorithm keeps the value for the sun-shade angle $\theta_S$. If the sun-shade angle $\theta_S$ is less than 270° at the decision diamond 70 and greater than a −270° at the decision diamond 74, then the sun-shade angle $\theta_S$ is set to s +360° at box 76. By going through this process of defining the sun-shade angle $\theta_S$ the position of the shade portion 14 is limited to the length of the tracks 16 and 18 in a positive and negative direction from a middle position of the base portion 12.

The sun-shade angle $\theta_S$ is output from the command processor 50 to a position control and actuation processor 52. The position control and actuator processor 52 calculates the position of the shade portion 14 based on the sun-shade angle $\theta_S$ and the distance the driver is from the sun visor 30.

FIG. 6 shows a plan view of a sun visor 80 relative to a driver's head 84. The sun visor 80 includes a shade portion 82. The processor 52 contains the information of the distance $D_d$ from the driver's head location 84 to the visor 80 according to predetermined vehicle parameters, and then can calculate the position of the shade portion 82 $D_S$ by a cosine function. The control actuation processor 52 outputs the position $D_S$ to a sun-shade position actuator 54 representing the actuator 34. The actuator 54 can include a position encoder to sense the location of the shade 14 and provide a feedback signal to the position control actuation processor 52 indicative of same. Therefore, when the position of the shade portion 14 is at the sun-shade angle position, the position control and actuation processor 52 stops the actuator command.

Once the shade portion 14 is in the desirable position, the driver may want to make minor adjustments thereto because of his sitting position, orientation, etc. According to another embodiment of the present invention, a shade assembly 90, shown in FIG. 7, replaces the shade portion 14. The shade assembly 90 includes a base member 92 including L-shaped end portions 94 and 96 that slide in the tracks 16 and 18. The position of the shade assembly 90 is automatically determined relative to the base portion 12 as discussed above. A shade piece 98 is slideably engagable within the L-shaped portions 94 and 96, as shown, so that the driver can slide the shade piece 98 relative to the base member 92 to make minor adjustments to the position of the shade piece 98.

Figure 8:
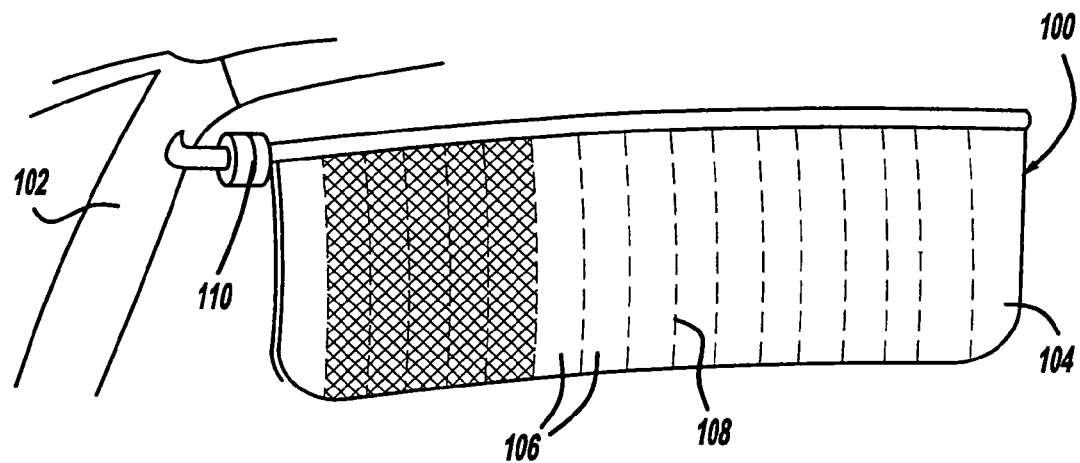
FIG. 8 is a partial plan view of a vehicle including a sun visor having electro-chromic control strips, according to another embodiment of the present invention.

In an alternate embodiment, selectively shading the sun visor is provided by electro-chromic strips. FIG. 8 is a front view of a sun visor 100 mounted to the A-pillar 102 of a vehicle. The sun visor 100 includes a clear base portion 104 and a plurality of electro-chromic strips 106 mounted to the base portion 104 in a vertical manner. Each separate electro-chromic strip 106 is a separate film that is taped or pasted to one side of the base portion 104, or alternately is laminated between clear pieces of the base portion 104. Each electro-chromic strip 106 is separated by a control line 108 that controls the strips 106. Particularly, if an electrical current is selectively applied to the lines 108, an electric field is created that causes the electro-chromic strips 106 to become opaque. Therefore, by selectively providing an electrical signal to the proper lines 108, certain-ones of the strips 106 can be made opaque depending on the sun angle. As above, a switch 110 is provided that turns on the control lines 108 when the sun visor 100 is in the down position. The operation of electro-chromic strips as discussed above is well understood to those skilled in the art. The process for selectively providing electrical signals to the control lines 108 can be determined by any suitable process, such as the process discussed above for automatically controlling the position of the shade portion 14.

Figure 9:
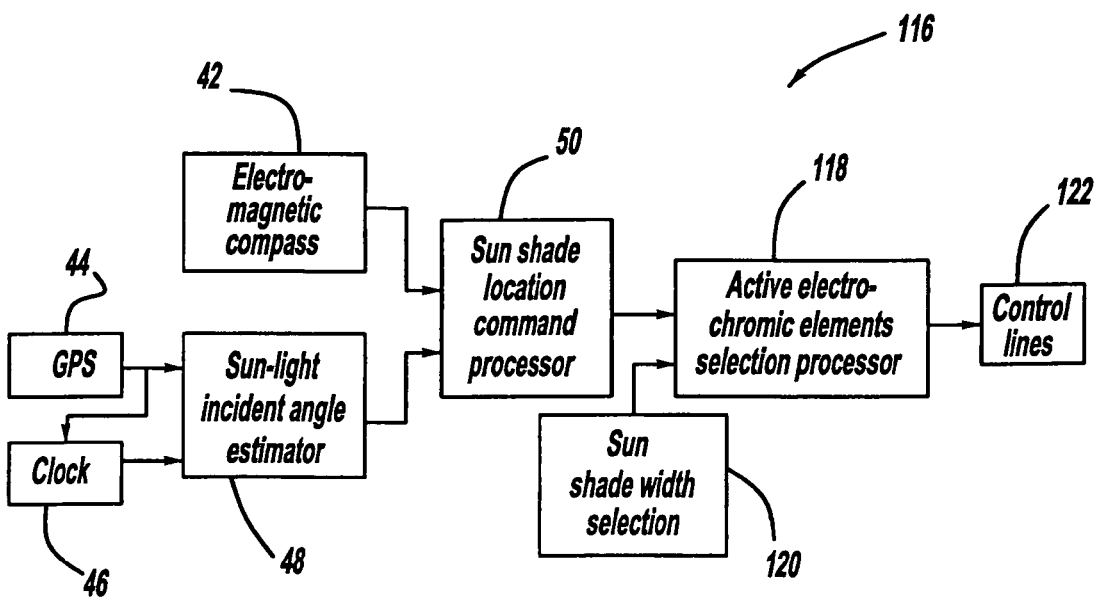
FIG. 9 is a block diagram of a system for automatically controlling which electro-chromic elements are activated based on the sun angle orientation.

FIG. 9 is a block diagram of a system 116 similar to the system 40, where like elements are identified by the same reference numeral. In this embodiment, the system 116 includes an active electro-chromic element selection processor 118 that receives the sun-shade angle $\theta_S$ from the command processor 50 and a sun-shade width selection from a processor 120. Using this information, the system 116 determines which of the control lines 108 will be provided with an electrical signal to provide the opaque electrical chromic strips depending on the sun angle. The processor 118 outputs control signals to control lines 122, representing the control lines 108.

Figure 10:
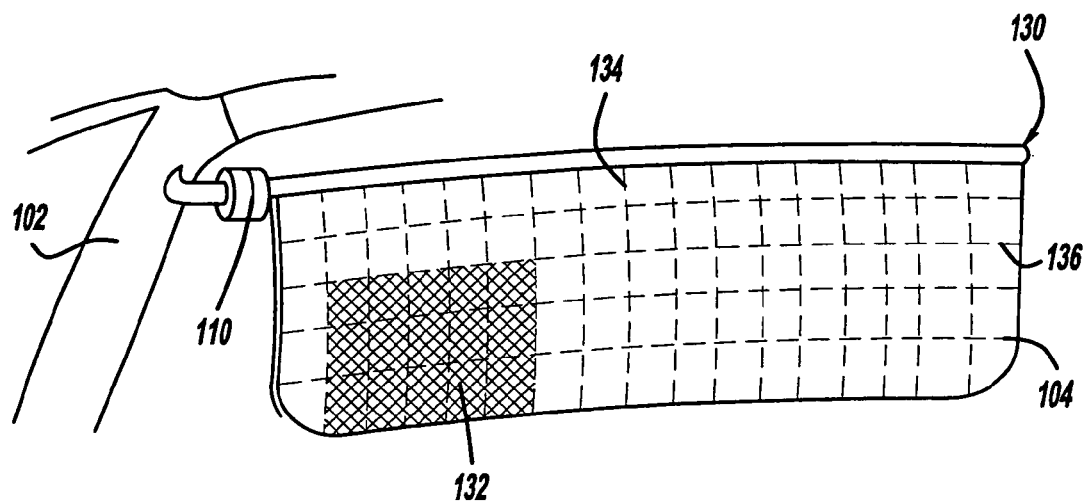
FIG. 10 is a partial plan view of a vehicle including a sun visor having square electro-chromic control elements, according to another embodiment of the present invention.

The electro-chromic strip art is fairly well developed and the electro-chromic strips 106 are relatively inexpensive. However, the art has advanced to a level where electro-chromic sections can be provided having both vertical and horizontal control lines. FIG. 10 is a front plan view of a sun visor 130 similar to the sun visor 100 where like elements are identified by the same reference numeral. In this embodiment, the electro-chromic strips 106 have been replaced with electro-chromic elements 132 that are basically square. In order to control the selected ones of the electro-chromic elements 132, both vertical control lines 134 and horizontal control lines 136 are provided. Therefore, the control of the opaque sections of the electro-chromic elements 132 can be more selectively determined based on the sun-shade angle $\theta_S$.

Figure 11:
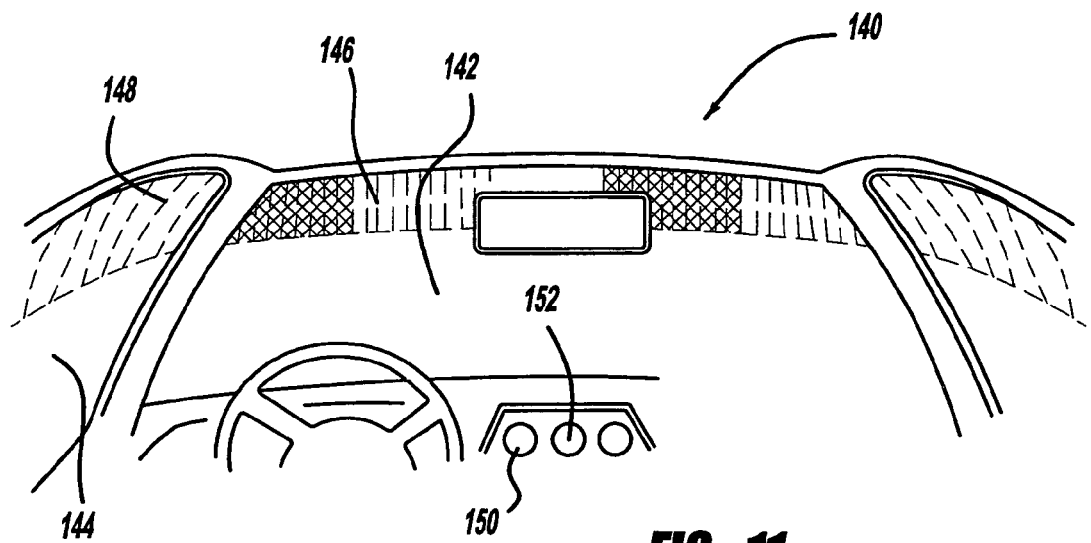
FIG. 11 is a partial plan view of a vehicle including electro-chromic elements formed in a windshield of the vehicle, according to another embodiment of the present invention.

In an alternate embodiment, the electro-chromic strips can be provided in the vehicle glass itself. FIG. 11 is a partial plan view of a vehicle 140 including a windshield 142 and a driver side door window 144. Electro-chromic strips 146 are provided at an upper location of the windshield 142 and electro-chromic strips 148 are provided at an upper location of the side window 144. The electro-chromic strips 146 and 148 are controlled in the same manner as discussed above depending on the sun incident angle to determine which of the strips 146 and 148 should be made opaque. The vehicle 140 includes a control button 150 for turning on the system that controls the strips 146 and 148 and a control button 152 that controls the width of the opaque section defined by the strips 146 and 148.

Figure 12:
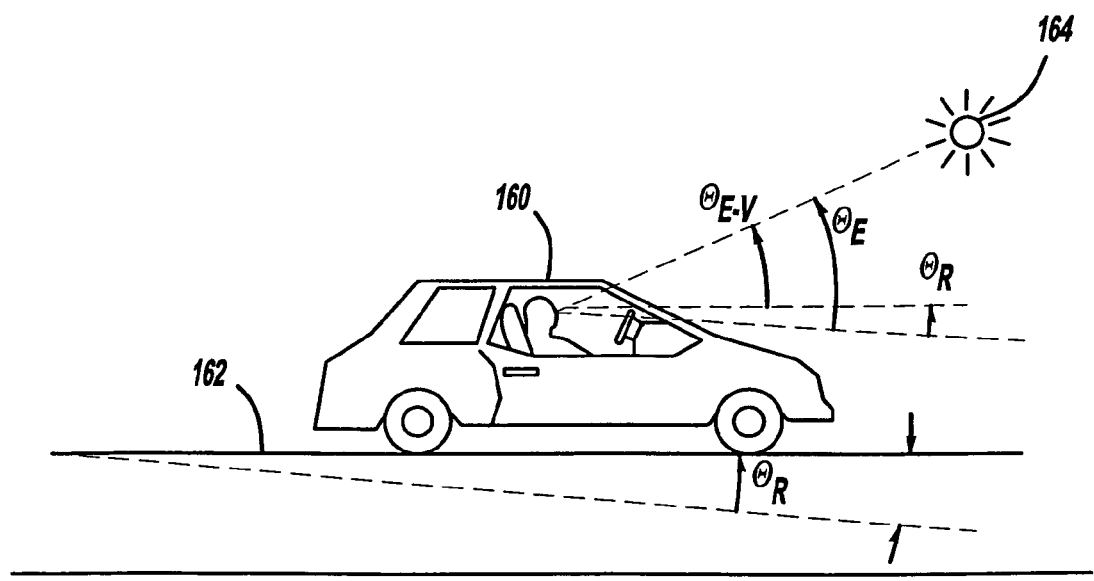
FIG. 12 is a side plan view of a vehicle showing vehicle orientation.

The clear-view sun visor of the invention can also be controlled depending on the road slope, according to another embodiment of the present invention. FIG. 12 shows a vehicle 160 traveling on a road 162 and heading into the sun 164. The sunlight shines onto a driver 166 when the elevation angle relative to the vehicle $\theta_{E-V}$ is below a certain threshold, where the threshold is determined by geographical location, local time and road slope. A control system can be designed to automatically turn on the sun-shade control. The control system may include an estimation of sunlight elevation angle $\theta_E$ and sensing sunlight intensity. GPS and local clock information can be used to determine the sun elevation angle relative to a level ground, and chassis sensors, such as suspension sensors or chassis accelerometers, can be used to determine the road slope angle $\theta_R$ to further determine the sunlight elevation angle relative to the vehicle 160 as:

$$\theta_{E-V} = \theta_E - \theta_R$$

When the estimated light elevation angle relative to the vehicle 160 is less than a threshold and the light intensity sensor indicates a value exceeding a predetermined threshold, the sun visor control can be turned on automatically.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A sun visor for a vehicle, said sun visor comprising:
   a transparent base portion;
   a shade portion mounted to the base portion, said shade portion being narrower than the base portion and being slideable relative thereto, said shade portion being slideable relative to the base portion by actuation of an actuator; and
   a controller, said controller determining the position of the shade portion by calculating a sun-shade angle, said sun-shade angle being determined by a vehicle heading and a sun-incident angle, said controller controlling the actuator to position the shade portion.

2. The sun visor according to claim 1 further comprising a switch that switches on the actuator when the sun visor is in a down position.

3. The sun visor according to claim 1 wherein the controller processes the sun-shade angle to be in a range between +90° and −90° relative to a center position of the base portion.

4. The sun visor according to claim 1 further comprising a compass that provides the vehicle heading, and a GPS receiver and a clock that provide a location and time to determine the sun-incident angle.

5. The sun visor according to claim 1 wherein the controller further determines a road slope angle to determine the sun-shade angle.

6. The sun visor according to claim 1 wherein the shade portion is part of a shade portion assembly including a mounting portion slideable relative to the base portion and a shade element slideable relative to the mounting portion.

7. The sun visor according to claim 1 wherein the shade portion is about four-inches wide.

8. A sun visor for a vehicle, said sun visor comprising:
   a transparent base portion;
   a shade portion mounted to the base portion, said shade portion being narrower than the base portion and being slideable relative thereto;
   an actuator for moving the shade portion relative to the base portion;
   a switch for turning on the actuator when the sun visor is in a down position;
   an electro-magnetic compass for providing a vehicle heading signal;
   a GPS receiver for providing a vehicle location signal;
   a clock for providing a time of day signal; and
   a controller responsive to the vehicle heading signal, the vehicle location signal and the time of day signal, said controller determining the position of the shade portion by calculating a sun-shade angle from the signals, said controller controlling the actuator to position the shade portion.

9. The sun visor according to claim 8 wherein the controller processes the sun-shade angle to be in a range between +90° and −90° relative to a center position of the base portion.

10. The sun visor according to claim 8 wherein the controller further determines a road slope angle to determine the sun-shade angle.

11. The sun visor according to claim 8 wherein the shade portion is part of a shade portion assembly including a mounting portion slideable relative to the base portion and a shade element slideable relative to the mounting portion.

12. A sun visor for a vehicle, said sun visor comprising:
   a transparent base portion; and
   a shade portion mounted to the base portion, said shade portion being narrower than the base portion and being slideable relative thereto, wherein the shade portion is part of a shade portion assembly including a mounting portion slideable relative to the base portion and a shade element slideable relative to the mounting portion.

13. The sun visor according to claim 12 wherein the shade portion is slideable relative to the base portion by actuation of an actuator.

14. The sun visor according to claim 13 further comprising a switch that switches on the actuator when the sun visor is in a down position.

15. The sun visor according to claim 13 further comprising a controller, said controller determining the position of the shade portion by calculating a sun-shade angle, said sun-shade angle being determined by a vehicle heading and a sun-incident angle, said controller controlling the actuator to position the shade portion.

16. The sun visor according to claim 15 wherein the controller processes the sun-shade angle to be in a range between +90° and −90° relative to a center position of the base portion.

17. The sun visor according to claim 15 further comprising a compass that provides the vehicle heading, and a GPS receiver and a clock that provide a location and time to determine the sun-incident angle.

18. The sun visor according to claim 15 wherein the controller further determines a road slope angle to determine the sun-shade angle.

19. The sun visor according to claim 12 wherein the shade portion is about four-inches wide.

* * * * *